Patented May 7, 1929.

1,711,930

UNITED STATES PATENT OFFICE.

WALTER DUISBERG, WINFRIED HENTRICH, AND LUDWIG ZEH, OF WIESDORF, NEAR COLOGNE, GERMANY, ASSIGNORS TO GRASSELLI DYESTUFF CORPORATION, OF NEW YORK, N. Y., A CORPORATION OF DELAWARE.

MONO AZO DYE.

No Drawing. Application filed January 16, 1925, Serial No. 2,928, and in Germany February 28, 1924.

We have found new and useful improvements in mono azo dyes.

This invention relates to the production of new mono azo dyes which dye wool violet to blue shades particularly fast to light and fulling.

In our copending application Serial No. 752,458, filed Nov. 26, 1924, which has matured into Patent No. 1,595,178, of Aug. 10, 1926, we have shown that mono azo dyes of the type dinitrobenzene-azo-arylamine having an acid group in the dinitrobenzene nucleus are particularly adapted for the dyeing of cellulose ethers and cellulose esters. We have now found that mono azo dyes of the same type, but having acid groups both in the diazo and in the coupling compound, dye animal fibres deep reddish and fast violet to blue shades.

These dyestuffs can be obtained by coupling diazotized dinitroaniline sulfonic or carboxylic acids, i. e. 2-6-dinitroaniline-4-sulfonic acid, 2-4-dinitroaniline-6-sulfonic acid, 2-4-dinitroaniline-6-carboxylic acid, with aniline, toluidine, naphthylamine-sulfonic or carboxylic acids.

Amongst the coupling components we found to be particularly useful 2-naphthylamine-sulfonic acids and 2-alkylamino-naphthalene-sulfonic acids, 2-amino-8-naphthol-sulfonic acid, 2-amino-8-naphthol-6-sulfonic acids substituted in the amino group, 2-(2'-carboxyl-phenyl)-amino-naphthalene, etc.

In order to further illustrate our invention, the following examples are given, the parts being by weight. It is, however, understood that our invention is not limited to these examples nor to the specific conditions given therein.

*Example 1.*—301 parts of 2-4-dinitro-aniline-6-sulfonic acid are diazotized with an amount of nitrosyl sulfuric acid prepared from 69 parts nitrite of soda. The diazo compound is coupled at 0° C. in aqueous solution with 259 parts 2-methyl-amino-naphthalene-7-sulfonate of soda, the mineral acidity during the coupling being gradually neutralized with sodium acetate. The dyestuff is isolated in the usual way. It is in form of its sodium salt a dark powder, soluble in water with a blue color, yielding by reduction with zinc and hydrochloric acid triamino-benzene-sulfonic acid and amino-2-methyl-amino-naphthalene-7-sulfonic acid. It dyes wool clear greenish blue shades, having good level dyeing properties and good fastness to light and fulling.

The dyestuff in the form of its free acid is represented by the following graphic formula:

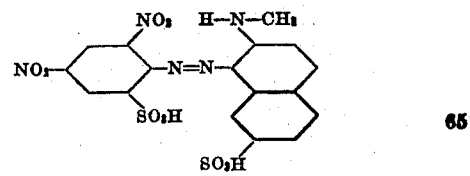

By using other coupling compounds the following shades are obtained: with 2-naphthylamine-7-sulfonic acid violet, with 2'-carboxy-phenyl-2-naphthylamine greenish blue, with phenyl-2-naphthylamine-6-sulfonic acid bright blue shades.

*Example 2.*—301 parts 2-4-dinitroaniline-6-sulfonate of potassium are diazotized as described in the above example, and the diazo compound coupled at 0° with a suspension of 2-amino-8-naphthol 6-sulfonic acid to which enough sodium acetate is added to neutralize the free mineral acidity. The dyestuff which is isolated in the usual way dyes wool dark navy-blue shades. It is in form of its sodium salt a dark powder, soluble in water with a dark blue color, yielding by reduction with zinc and hydrochloric acid triamino-benzene-sulfonic acid and amino-2-amino-8-naphthol-6-sulfonic acid.

The dyestuff in the form of its free acid is represented by the following graphic formula:

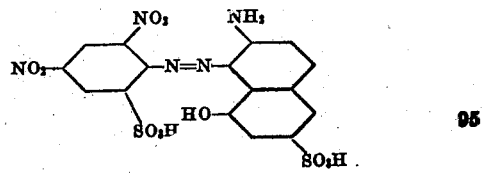

The dyestuff from 1-diazo-2-6-dinitrobenzene-4-sulfonic acid and 2-methylamino-8-naphthol-6-sulfonic acid prepared in the same way dyes greenish blue shades on wool.

*Example 3.*—244 parts 2-4-dinitro-1-amino-6-benzoate of ammonium are diazotized as described in Example 1. The diazo compound is coupled at 0° C. in water solution with 259 parts 2-methylamino-naphthalene-7-sulfonate of sodium; after having been isolated in the usual way it dyes wool bluish violet shades. It is in form of its sodium salt a dark powder, soluble in water with a bluish violet color, yielding by reduction with zinc and hydrochloric acid triamino-benzoic acid and amino-2-methylamino-naphthalene-7-sulfonic acid.

The dyestuff in the form of its free acid is represented by the following graphic formula:

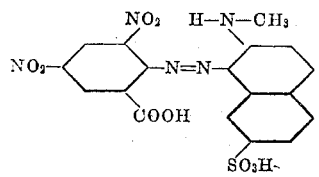

*Example 4.*—280 parts of 2-6-dinitroaniline-4-sulfonic acid are diazotized and coupled at 0° C. in water solution with 259 parts of 2-methylamino-naphthalene-7-sulfonic acid. The dyestuff is isolated in the usual way; it dyes clear violet shades on wool. It is in form of its sodium salt, a dark powder, soluble in water with a violet color, yielding by reduction with zinc and hydrochloric acid 1-2-6-triamino-benzene-4-sulfonic acid and amino-2-methylamino-naphthalene-7-sulfonic acid.

In the claims the term "acid substituted" is meant to include only those compounds which form esters when a hydrogen atom of the acid substituent is replaced by an alcoholic radicle.

We claim:

1. The process of producing mono azo dyes which consists in diazotizing acid substituted dinitroanilines and coupling the diazo compounds obtained with acid substituted aromatic amines.

2. The process of producing mono azo dyes which consists in diazotizing dinitroaniline sulfonic acids and coupling the diazo compounds obtained with acid substituted aromatic amines.

3. The process of producing mono azo dyes which consists in diazotizing acid substituted dinitroanilines and coupling the diazo compounds obtained with naphthylamine sulfonic acids.

4. The process of producing mono azo dyes which consists in diazotizing dinitroaniline sulfonic acids and coupling the diazo compounds obtained with naphthylamine sulfonic acids.

5. The process of producing mono azo dyes which consists in diazotizing acid substituted dinitroanilines and coupling the diazo compounds obtained with beta-naphthylamine sulfonic acids.

6. The process of producing mono azo dyes which consists in diazotizing acid substituted dinitroanilines and coupling the diazo compounds obtained with beta-naphthylamine sulfonic acids substituted in the amino group.

7. The process of producing mono azo dyes which consists in diazotizing acid substituted dinitroanilines and coupling the diazo compounds obtained with amino-naphthol-sulfonic acids.

8. As new products the mono azo dyes which can be obtained by combining diazotized, acid substituted dinitroanilines with acid substituted aromatic amines, which dyestuffs are in form of their alkali metal salts dark powders soluble in water with from reddish to violet to blue colors, yielding by reduction with zinc and hydrochloric acid an acid substituted triaminobenzene and an acid substituted aromatic diamine, dyeing wool in an acid dye bath from violet to blue shades fast to light and fulling.

9. As new products the mono azo dyes which can be obtained by combining diazotized dinitroaniline sulfonic acids with acid substituted aromatic amines, which dyestuffs are in form of their alkali metal salts dark powders, soluble in water with from reddish to violet to blue colors, yielding by reduction with zinc and hydrochloric acid a triaminobenzene sulfonic acid and an acid substituted aromatic diamine and dyeing wool violet to blue shades fast to light and fulling.

10. As new products the mono azo dyes which can be obtained by combining diazotized dinitroaniline sulfonic acids with naphthylamine sulfonic acids which dyestuffs are in the form of their alkali metal salts dark powders, soluble in water in from violet to blue colors, yielding by reduction with zinc and hydrochloric acid a triaminobenzene-sulfonic acid and a naphthylenediamine sulfonic acid, and dyeing wool from violet to blue shades fast to light and fulling.

11. As new products, the mono azo dyes which can be obtained by combining diazotized dinitroaniline sulfonic acids with, in the amino group substituted naphthlyamine sulfonic acids which dyestuffs are in the form of their alkali metal salts dark powders soluble in water with blue color, yielding upon reduction with zinc and hydrochloric acid a triaminobenzene sulfonic acid and an aminoalkyl-amino-naphthalene sulfonic acid and dyeing wool blue shades fast to light and fulling.

12. As new products the mono azo dyes which can be obtained by combining diazotized dinitroaniline sulfonic acids with beta-naphthylamine sulfonic acids, which dyestuffs are in form of their alkali metal salts dark powders, soluble in water with from violet to blue color, yielding upon reduction with zinc and hydrochloric acid a triaminobenezne sulfonic acid and an amino-beta-naphthylamine-sulfonic acid and dyeing wool violet to blue shades fast to light and fulling.

13. As new products, the mono azo dyes which can be obtained by combining diazotized dinitroaniline sulfonic acids with amino naphthol sulfonic acids, which dyestuffs are in form of their alkali salts dark powders, soluble in water with blue color, yielding upon reduction with zinc and hydrochloric acid a triamino-benzene-sulfonic acid and a diamino-naphthol-sulfonic acid and dyeing wool blue shades fast to light and fulling.

14. As a new product the mono azo dye which can be obtained by combining in aqueous acid solution diazotized-2-4-dinitro-aniline-6-sulfonic acid with 2-amino-8-naphthol-6-sulfonic acid, which dyestuff is in form of its alkali metal salt a dark powder soluble in water with a blue color, yielding upon reduction with zinc and hydrochloric acid 1-2-4-triaminobenzene-6-sulfonic acid and amino-2-amino-8-naphthol-6-sulfonic acid, and dyeing wool blue shades fast to light and fulling, substantially as described.

In testimony whereof we have hereunto set our hands.

WALTER DUISBERG.
WINFRIED HENTRICH.
LUDWIG ZEH.